United States Patent [19]
Klintworth et al.

[11] Patent Number: 5,775,891
[45] Date of Patent: Jul. 7, 1998

[54] GRATE COOLER FOR COMBUSTION MATERIAL AND PROCESS FOR ITS OPERATION

[75] Inventors: Klaus Klintworth; Joachim Harder, both of Buxtehude, Germany

[73] Assignee: Babcock Materials Handling Division GmbH, Buxtehude, Germany

[21] Appl. No.: 586,868

[22] PCT Filed: May 30, 1995

[86] PCT No.: PCT/EP95/02060

§ 371 Date: Jan. 24, 1996

§ 102(e) Date: Jan. 24, 1996

[87] PCT Pub. No.: WO95/33172

PCT Pub. Date: Dec. 7, 1995

[30] Foreign Application Priority Data

May 30, 1994 [DE] Germany .................. 44 18 885.4

[51] Int. Cl.[6] .................................................. F27D 15/02
[52] U.S. Cl. .................................. 432/78; 432/77; 432/85
[58] Field of Search .............................. 432/77, 78, 82, 432/83, 85

[56] References Cited

U.S. PATENT DOCUMENTS

| | | | |
|---|---|---|---|
| 3,162,431 | 12/1964 | Müller et al. | 263/32 |
| 3,831,291 | 8/1974 | Kayatz | 432/77 |
| 3,922,797 | 12/1975 | Dick | 432/78 |
| 3,957,111 | 5/1976 | Kobayashi et al. | 432/77 |
| 4,059,396 | 11/1977 | Dano | 432/78 |
| 4,101,337 | 7/1978 | Dano | 106/101 |
| 4,141,154 | 2/1979 | Buchner | 432/77 |
| 4,457,081 | 7/1984 | Von Wedel | 432/77 |
| 4,503,783 | 3/1985 | Musschoot | 432/77 |
| 5,118,287 | 6/1992 | Orac et al. | 432/78 |
| 5,201,652 | 4/1993 | Kawamura et al. | 432/78 |

FOREIGN PATENT DOCUMENTS

| | | | |
|---|---|---|---|
| A 943473 | 3/1949 | France . | |
| A 2102623 | 4/1972 | France | F27B 7/00 |
| A 2 286 802 | 4/1976 | France | C04B 7/50 |
| 35 21 586 C2 | 8/1989 | Germany | C04B 7/47 |

*Primary Examiner*—Harold Joyce
*Assistant Examiner*—Jiping Lu
*Attorney, Agent, or Firm*—Alix, Yale & Ristas, LLP

[57] ABSTRACT

In a grate cooler, the unstable state which is attributable to an unusually strong accumulation of the combustion material is prevented by the fact that the waste air from the cooler, which is to be fed as secondary air to the kiln, is injected with water. This is expediently carried out in the inlet region of the cooler in dependence upon the temperature and/or the pressure of the secondary air in the kiln hood.

5 Claims, 1 Drawing Sheet

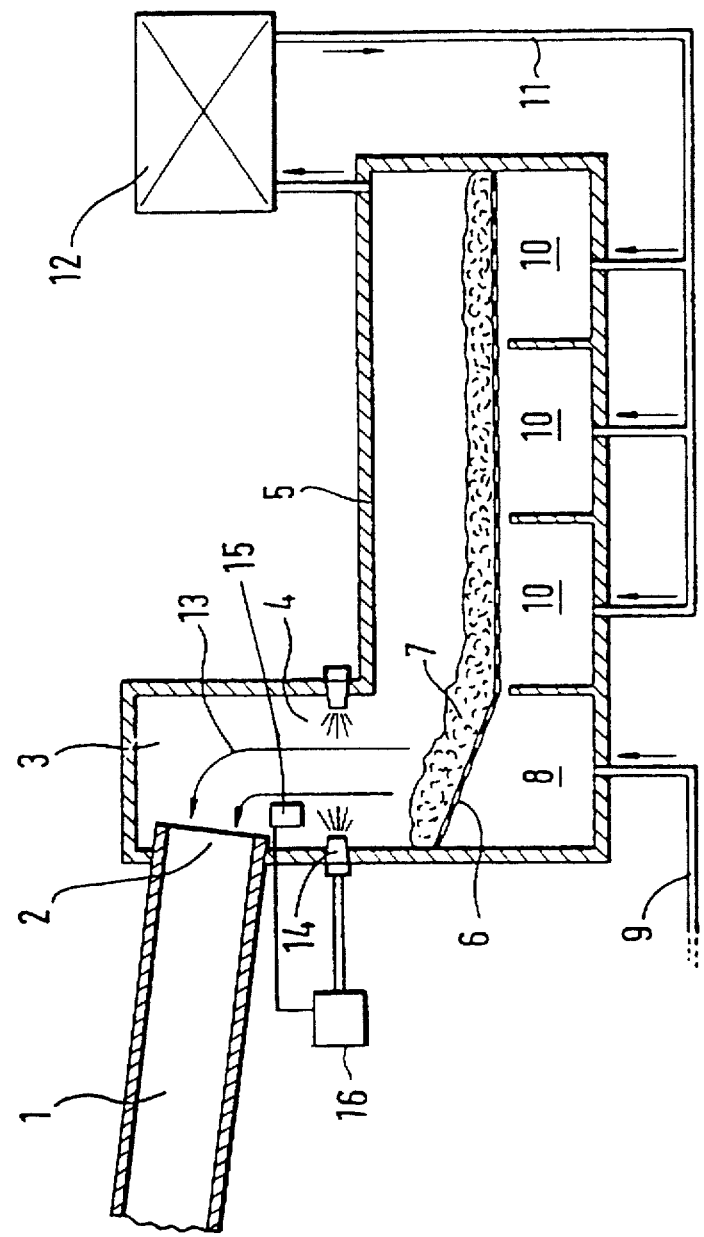

GRATE COOLER FOR COMBUSTION MATERIAL AND PROCESS FOR ITS OPERATION

BACKGROUND OF THE INVENTION

In grate coolers for combustion material, especially for the cooling of cement clinker, the combustion material expelled from the associated kiln forms a bed on the cooler grate, which bed is flowed through by cooling air, which picks up heat and dust. Part of the cooling air is returned via a heat exchanger to the cooler. Another part is fed to the kiln as secondary air for the combustion operation. The missing volume of air is supplied as fresh air to the cooler. Ideally, a cooler of this kind can be operated free from waste air, i.e. there is no waste air passed directly into the atmosphere. This objective has so far proved unattainable in practice, since, given certain irregularities in the kiln operation, a large quantity of combustion material may briefly accumulate in the cooler, causing the temperature and volume of the secondary air and hence the pressure in the kiln hood to rise strongly. Whilst the kiln hood pressure can be regulated, under normal operating conditions, by adjusting the volume of cooling air fed to the cooler, the volume of cooling air cannot be adequately reduced when considerable quantities of combustion material suddenly accumulate, since a certain minimum volume of cooling air is necessary to prevent heat damage to the cooler. Although consideration has been given to regulating the kiln hood pressure by adjusting the drawoff from the kiln to cope with unsteady states, this is impracticable because of the long time lag. It has therefore been necessary to resort to installing an emergency stack, by means of which, in irregular states, waste air is drawn off from the cooler; this is contrary, however, to the notion of a waste-air-free system. In addition, circulating-air processes have been developed, which meet their stumbling block, however, in the additional energy which has to be expended.

In this context, it should be borne in mind that remedy is difficult, above all because the kiln and cooler constitute, in control-engineering terms, an oscillatory system. An increased accumulation of combustion material in the cooler produces an increase in secondary-air temperature. This leads to increased temperature in the kiln and hence to the formation of a higher melt-phase component in the sintering zone. This results in a temporarily reduced discharge of combustion material from the kiln, causing a renewed drop in the secondary air temperature and hence in the melt-phase component of the clinker, which again brings again a rise in material discharge and the commencement of a new cycle. In one particular example, for instance, the secondary-air temperature fluctuated between around 700° C. and 850° C. and the kiln drive current (as a measure of the kiln charge) fluctuated between around 180 and 250amperes in opposite directions with an oscillation period of around 2 hours. The rise in secondary-air temperature and the fall in the drive power of the kiln generally occurred abruptly within just a few minutes.

Attempts have been made to even out the energy flow by means of a variable booster-firing operation; this should be rejected however, since it adversely affects the recuperation of the cooler; for the secondary-air temperature would then need to be permanently lowered, even in the steady state.

It is also known (FR-B 2 102 623) to adjust the temperature of the secondary air to be fed to the kiln by proceeding to feed cooling air of different temperature from two different sources to the first cooler sections from which the secondary air originates as waste air. By suitably determining the relationship between the two air volumes to be fed, it is possible within certain limits to exert influence upon the secondary air. This influence materializes very slowly, however, and is too weak to produce a reasonably rapid reaction to an irregularly strong kiln discharge. The complexity of equipment which is required to provide two air-supply sources of different temperature is also very high.

The object of the invention, where there is an elevated accumulation of combustion material, is to combat the development of an unsteady state and to stabilize the cooler and kiln operations.

The invention envisages that, in the event of an above-average accumulation of combustion material, water is injected into the waste air from the cooler to be fed to the kiln. Its temperature is thereby able to be abruptly reduced. A precondition is that the evaporation energy of the water shall be drawn from the waste air from the cooler. The injection should therefore be carried out such that the water does not impact upon or only negligibly impacts upon the combustion material to be cooled or the walls of the duct leading from the cooler to the kiln.

Although it is known (U.S. Pat. No. 3,162,431) to inject water into the cooler, this is done to increase the humidity of the air with regard to better functioning in an electric filter. The air temperature should expressly not be lowered as a result.

It is additionally known (FR-A 943 473) to introduce water or saturated or overheated water vapour into a cement rotary kiln, in order to prevent local overheating of the kiln process, in that heat is removed by dissociation of the water vapour at the site in question. There is no discussion of any effect upon the thermal oscillation characteristics of the system consisting of kiln and cooler.

SUMMARY OF THE INVENTION

In brief, a grate cooler in accordance with the invention injects water into the secondary air stream.

The water injection expediently takes place in the inlet region of the cooler, i.e. where the combustion material is expelled from the kiln into the cooler and the waste air from the cooler, having flowed through the combustion material bed, is fed as secondary air to the kiln. The water injection is carried out by nozzles operated by suitable means in dependence upon the state of the waste air from the cooler which is to be fed as secondary air to the kiln, namely preferably in dependence upon the pressure and/or temperature of the said waste air, which should be measured by suitable sensor means and, as far as possible, free from inertia.

Where there is an unusually strong, sudden accumulation of combustion material, excess energy can consequently be absorbed and the creation of an unsteady state thereby prevented.

The water injection initially produces a reduction in the temperature of the secondary air and also, therefore, a slackening of its pressure. The pressure envisaged in the kiln hood (normally a weak vacuum) can generally be maintained, so that dust is prevented from escaping through connecting gaps. The temperature of the kiln flame is reduced as a result of the lower temperature and greater mass of the secondary air. The formation of combustion material having an essentially unaltered melt-phase component and hence an even kiln discharge can thereby be realized. Other causes which may have a destabilizing effect upon the kiln operation (for example crusting) are also repressed. The entire cooler-kilnsystem can be run more evenly. Fuel savings are obtained, which may be in excess of 10%.

The injection of water has no need to remain confined to instances of instability. Even in the normal state of regulation, it can help to reduce fuel consumption, since the higher water vapour component leads to improved heat transfer.

Increased secondary-air temperatures, as occur, in particular, when there are fluctuations in the operating state, are blamed for part of the harmful NOx-formation in cement kiln installations. In this respect also, through limitation and evening-out of the secondary-air temperature, the invention furnishes an improvement.

The use of the water injection according to the invention to cope with unstable operating states does not stand in the way of complementary, (where appropriate) simultaneous and coupled usage of other processes for stabilizing the cooler and kiln operations, for example regulation of the flame length or control of the air distribution over the length or width of the grate cooler.

BRIEF DESCRIPTION OF THE DRAWING

The invention is explained in greater detail below with reference to the drawing, which shows an advantageous illustrative embodiment in a diagrammatic representation.

DETAILED DESCRIPTION OF THE PREFERRED EMBODIMENT

The rotary kiln 1 is fired in a known but nonrepresented manner at its expulsion end 2, which is connected to the kiln hood 3 and is adequately sealed against it. The material which is burnt in the kiln 1 falls in the inlet region 4 of the cooler 5 onto the cooler grate 6, on which it forms a bed 7, which is flowed through from the bottom upwards by cooling air. The cooler section 8 located in the inlet region of the cooler is fed fresh air via the line 9. The other cooler sections 10 receive the cooling air via a line 11 from a heat exchanger 12, to which the greatest part of the waste air from the cooler is fed. The difference, namely primarily the waste air originating from the hottest section of the cooler, is fed as secondary air to the kiln 1, as illustrated by arrows 13. In the inlet region 4 there are nozzles 14, from which water can be sprayed in a controlled amount by control means into the secondary air current 13 in dependence on the air condition sensed by air condition sensor 15 communicating with control means 16. This is done in the finest possible distribution so as to obtain a rapid evaporation of the water and hence rapid repercussions upon the temperature and pressure of the secondary air in the kiln hood 3.

Apart from the secondary-air supply to the kiln 1, there is normally no provision for any further drawoff of waste air to the cooler 5. However, the invention does not wish to preclude the provision, in rare cases of this kind in which an unusually strong kiln expulsion might occur for which the water injection according to the invention —through the nozzles 14 —is not designed, of emergency draw-off devices for air present in the cooler.

We claim:

1. A process for dampening the thermal oscillations in a grate cooler system for use with a kiln, comprising an air-cooled grate cooler for supporting a bed of combustion material fed thereto from the kiln for cooling and a cooling inlet therebetween, wherein cooling air passes through the bed for cooling the material forming the bed and a portion of the air after passing through the bed is fed to the kiln as secondary combustion air comprising the steps of:

sensing the condition of the air portion having passed through the bed; and injecting water into said air portion within the cooler inlet to cause evaporation thereof as said air portion flows toward the kiln, the quantity of water injected being in response to the sensed air condition.

2. The process according to claim 1, wherein the step of sensing includes measuring the temperature of said air portion.

3. The process according to claim 1, wherein the step of sensing includes measuring the pressure of said air portion.

4. The process of claim 1 wherein the injection of water provides a fine distribution of the water within said air portion for rapid evaporation.

5. The process of claim 1 further comprising the steps of measuring the accumulation of combustion material in said bed and wherein said water injection is in response to said accumulation measurement.

* * * * *